(12) United States Patent
Abramovitch

(10) Patent No.: US 7,401,502 B2
(45) Date of Patent: Jul. 22, 2008

(54) NANO POSITION SENSING AND SURFACE ESTIMATION IN SCANNING PROBE MICROSCOPES USING REFERENCE ESTIMATION

(75) Inventor: Daniel Y Abramovitch, Palo Alto, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 31 days.

(21) Appl. No.: 11/536,501

(22) Filed: Sep. 28, 2006

(65) Prior Publication Data

US 2008/0078230 A1   Apr. 3, 2008

(51) Int. Cl.
*G01B 5/28* (2006.01)
*G02B 6/26* (2006.01)

(52) U.S. Cl. .................................................. 73/105
(58) Field of Classification Search .................. 73/105
See application file for complete search history.

(56) References Cited

U.S. PATENT DOCUMENTS

| | | | | |
|---|---|---|---|---|
| 5,804,710 | A * | 9/1998 | Mamin et al. | 73/105 |
| 6,181,131 | B1 * | 1/2001 | Bruland et al. | 324/300 |
| 7,066,014 | B2 * | 6/2006 | Salapaka et al. | 73/105 |
| 7,155,964 | B2 * | 1/2007 | Huang et al. | 73/105 |
| 7,289,868 | B2 * | 10/2007 | Picciotto et al. | 700/121 |
| 7,313,948 | B2 * | 1/2008 | Salapaka et al. | 73/105 |
| 2006/0225490 | A1 * | 10/2006 | Xi et al. | 73/105 |

* cited by examiner

*Primary Examiner*—Michael Cygan

(57) ABSTRACT

A substitute reference signal input is incorporated into a state space controller for a scanning probe microscope to improve tracking efficiency.

16 Claims, 9 Drawing Sheets

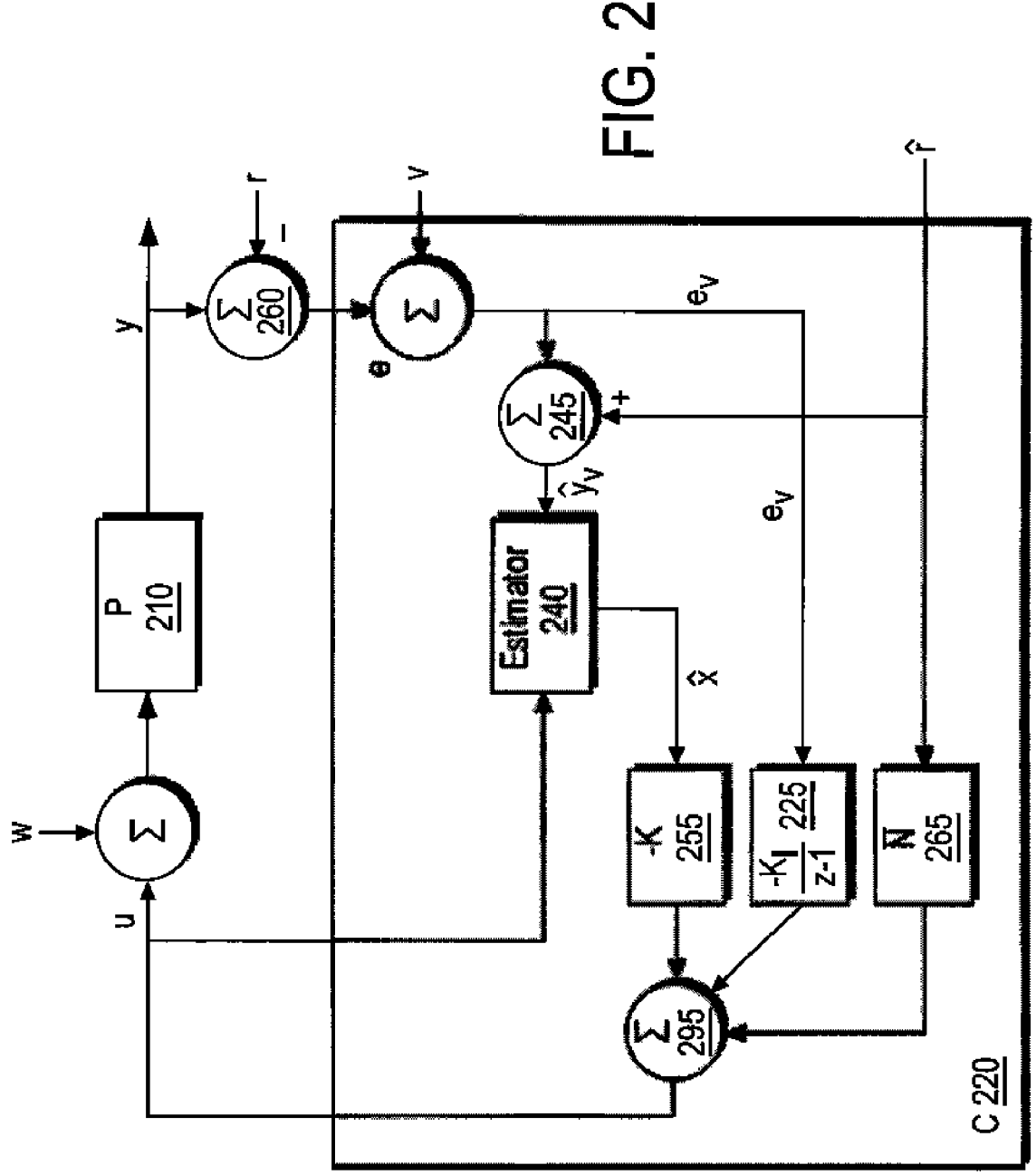

NANO POSITION SENSING AND SURFACE ESTIMATION IN SCANNING PROBE MICROSCOPES USING REFERENCE ESTIMATION

BACKGROUND

For a typical scanning force microscope such as the atomic force microscope, a micromachined tip is scanned across a surface which results in the cantilever attached to the tip being deflected. Typically, the cantilever is controlled in the direction normal to the surface being scanned by an actuator such as a piezoelectric tube or a MEMS actuator. The deflection is typically detected by illuminating the cantilever using a laser beam. While it is possible to measure the deflection and use that as a position signal, large deflections may damage the tip and the surface being scanned. By ensuring that the deflection is close to some nominal point by moving either the cantilever or the surface being scanned, any potential damage is reduced. Hence, an additional signal besides the cantilever deflection is typically needed to provide an estimate for surface height.

BRIEF SUMMARY

A substitute reference signal input is incorporated into a state space controller for a scanning probe microscope to improve tracking efficiency.

BRIEF DESCRIPTION OF THE DRAWINGS

FIG. 2 shows a feedback loop in accordance with the invention.

DETAILED DESCRIPTION

Figure 1A:
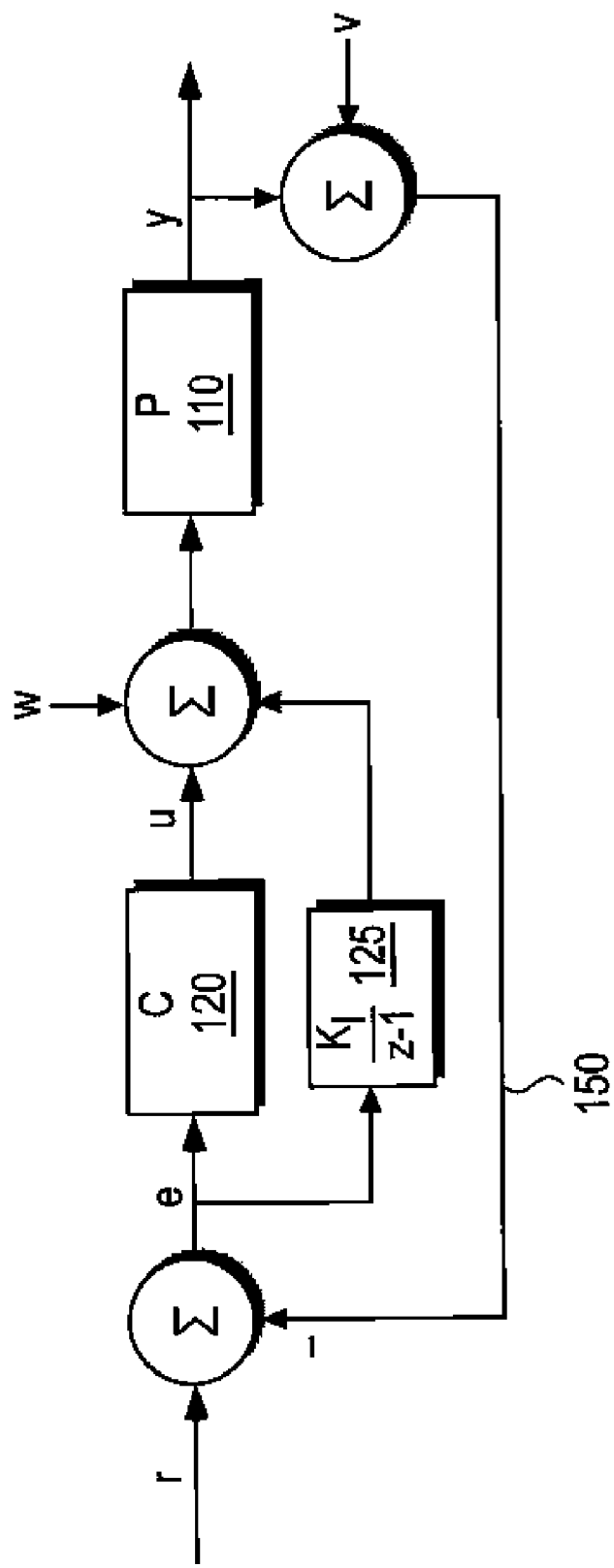
FIG. 1a shows a prior art feedback loop.

FIG. 1a shows a typical feedback loop. Physical system 110 is denoted by P and state space controller 120 is denoted by C. The output is given by y and the external reference to the system is given by r which is typically the topology of the surface being scanned in scanning probe microscope applications. Feedback loop 150 minimizes the error, e, between r and y. Noise entering physical system 110 is denoted by w and noise entering the output sensor is denoted by v. Integrator 125 is shown in FIG. 1 in the discrete time form: $K_I/(z-1)$ and may be included as part of state space controller 120 but is separated out for clarity.

Figure 1B:
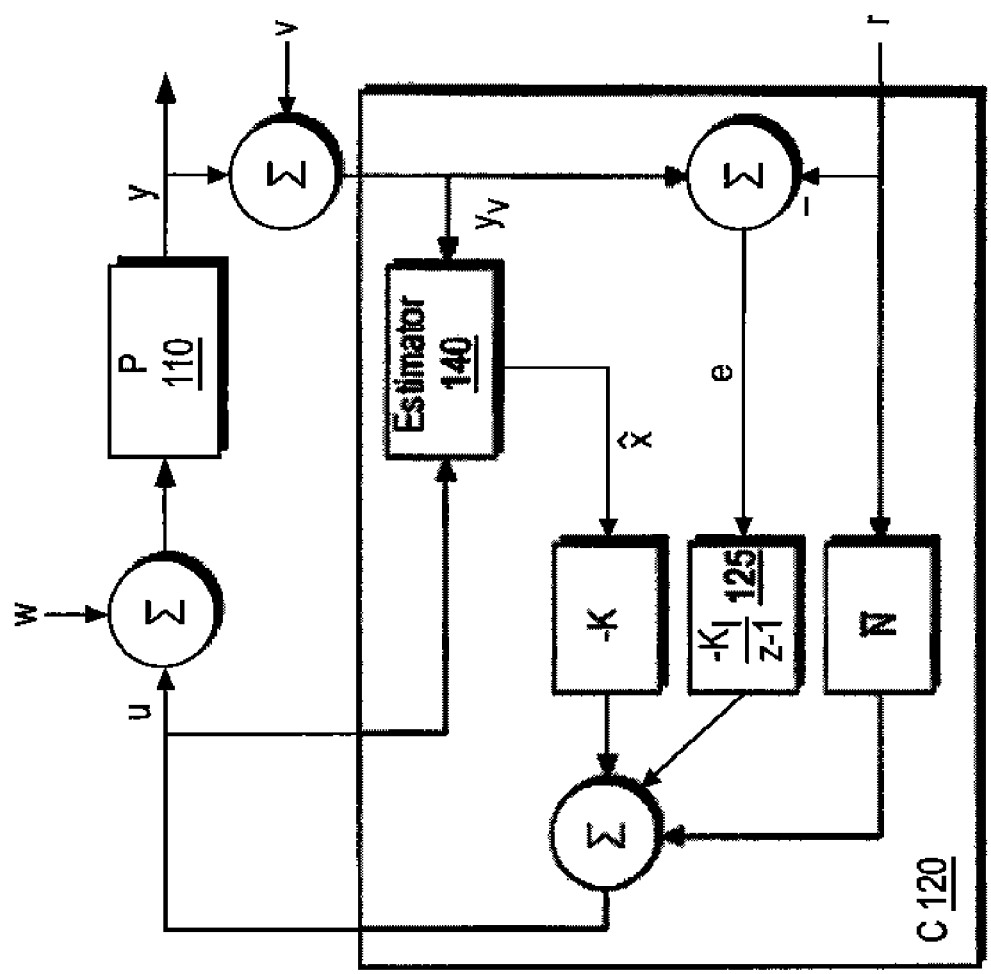
FIGS. 1b-e graphically show the steps in the derivation of a feedback loop that can accept a substitute reference signal input.

FIG. 1b shows state space controller 120 with integral action. Estimator 140 receives the measured output, $y_v$, the controller output, u, and outputs the state estimate, $\hat{x}$, but integrator 125 receives the difference signal, e, between reference signal, r, and measured output, $y_v$. $\overline{N}$ is the reference input gain matrix computed from the system model and the state feedback gain, K. Any noise, v, in the measured output, $y_v$, is received by integrator 125 which acts to smooth the noise that is present. The integral action reduces the steady state error of the system. Integral action is necessary to have zero steady state error to a step input. For systems that do not have an integrator in physical system 110, integrator 125 functions to cause the stable closed-loop system to have zero steady state error in response to a step input.

Figure 1C:
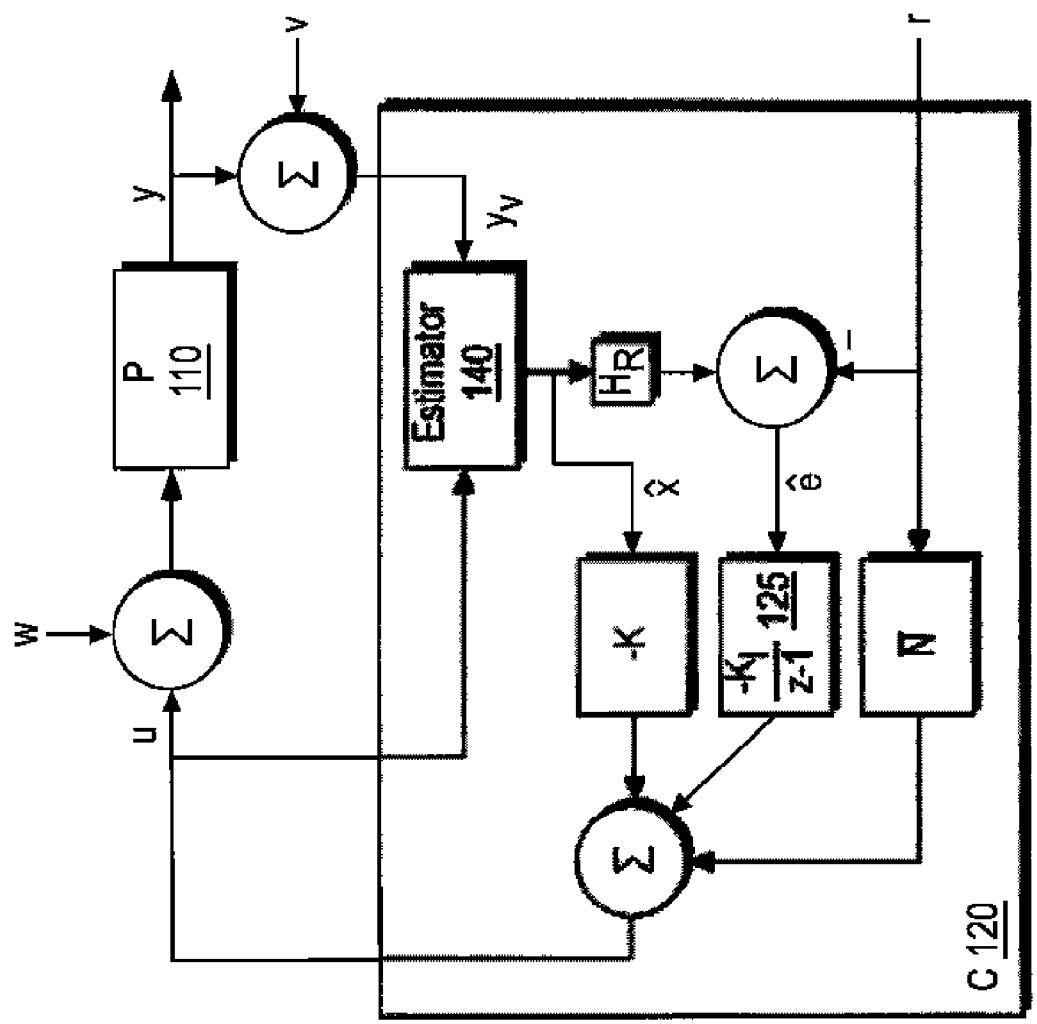

However, as FIG. 1c shows, estimator 140 can be used to provide a more highly filtered version of the output. Estimator 140 can be designed to achieve a balance between the physical system noise, w, and the measurement noise, v, so that the signal, $\hat{y}_R = H_R \hat{x}$, that is differenced from the reference signal, r, has been conditioned to reduce the effects of noise. $H_R$ is an output matrix that uses the state estimate to produce a set of system outputs that are suitable for differencing from the reference output, r. Hence, the error signal, $\hat{e}$, is generated using the estimated state.

Figure 1D:
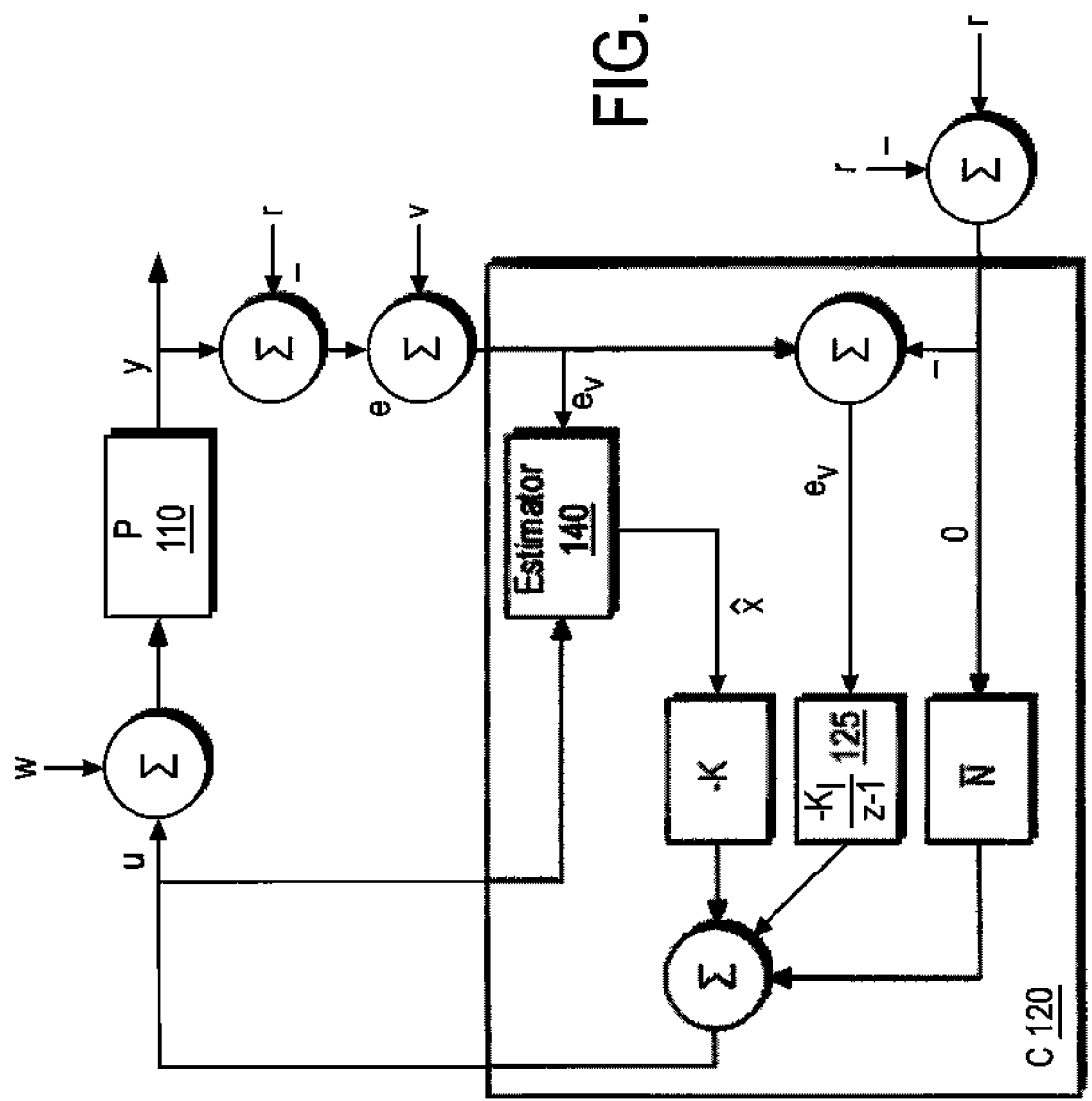

FIG. 1d shows state space controller 120 with integral control so that integrator 125 only receives the output error, $e_y = (y_r - r)$. The reference signal, r, is directly subtracted from the noisy output signal, $y_v$. Estimator 140 only receives the error signal, $e_y$. Note that FIG. 1c is modified by subtracting the reference signal, r, from itself so that a null signal is going into the reference input gain matrix, $\overline{N}$, of state space controller 120. However, without the measured output signal, $y_v$, being input to estimator 140, the configuration shown in FIG. 1d exhibits significant error in response to any unknown reference signal, r. This occurs because estimator 140 needs to settle out through loop dynamics before it can respond to r. The system only responds to r(t) when it is eliminating the error induced at time t, e(t). The system can only do this at some future time, (t+τ) which is determined by the speed of the dynamics of the estimator and the closed-loop system. This behavior is well-known with respect to output error state space controllers.

Figure 1E:
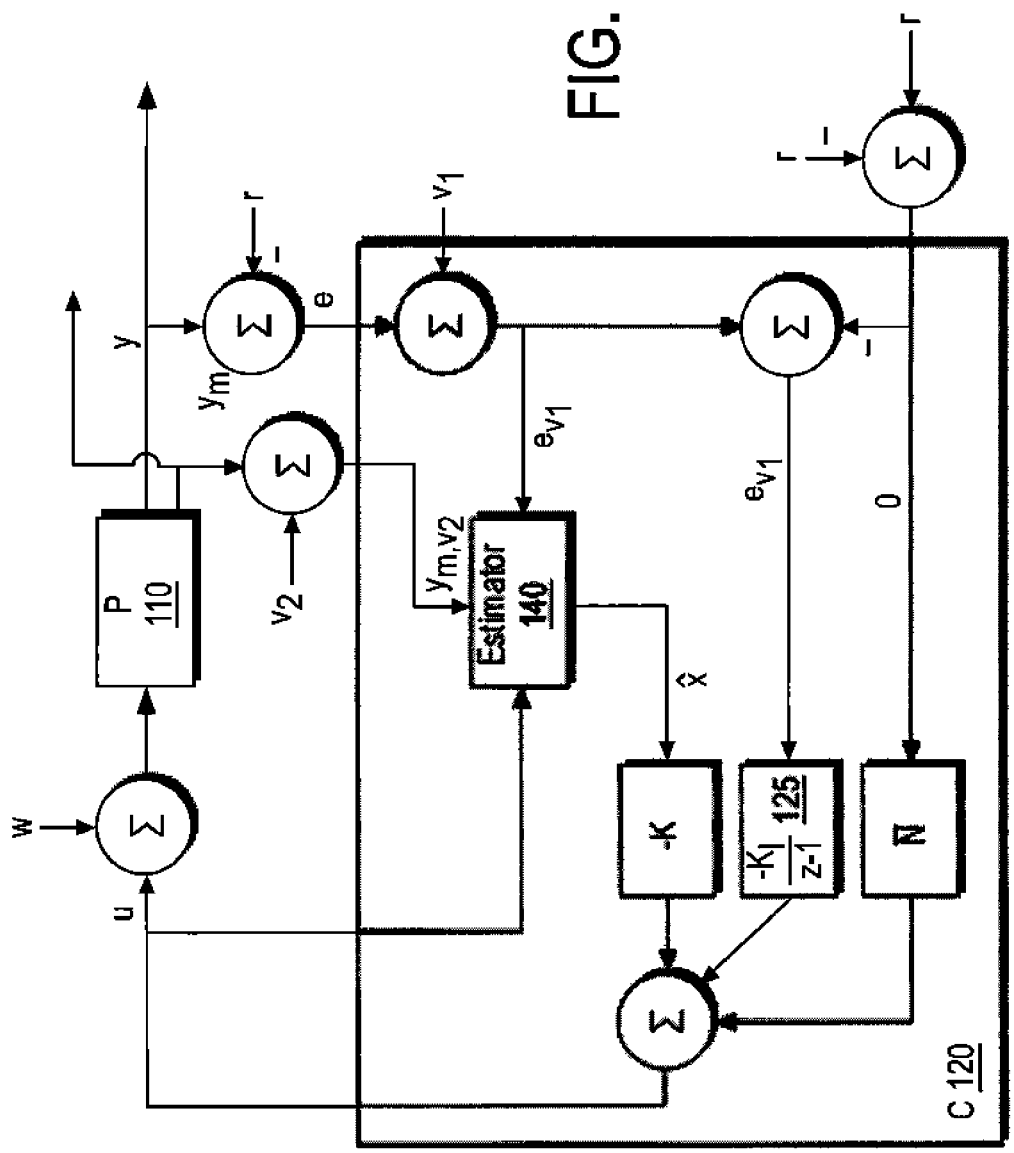

FIG. 1e shows state space controller 120 with integral control where integrator 125 receives the output error signal, $e_{v_1}$. However, unlike the configuration shown in FIG. 1d, estimator 140 also receives the actuator position signal, $y_{M,v_2}$ as well as the output error signal, $e_{v_1}$. Here $v_1$ and $v_2$ are the noise associated with the optical sensor and the actuator position sensor, respectively. This results in better performance by estimator 140 in tracking the unknown reference signal, r, because a direct measurement of the actuator position, $y_{M,v_2}$ is available. However, estimator 140 still waits for the actuator to respond to the output error signal, $e_{v_1}$. This suggests that a benefit may be obtained by providing a substitute reference signal, $\hat{r}$.

In the case of a scanning probe microscope such as an atomic force microscope, the reference signal, r, is generated by the surface being scanned. Knowledge of the reference signal, r, as a function of the α and β position over the surface would obviate the need for the measurement. However, generating a substitute reference signal, $\hat{r}$, either from a previous surface scan or previous scan lines can be used to improve the performance of scanning probe microscope servo loops and the resulting surface images produced.

In accordance with the invention, a substitute reference signal, $\hat{r}$, is used to improve the performance of the estimator and control loop resulting in an improved speed of image acquisition. FIG. 2 shows state space controller 220 with integral action and output error for physical system 210 in accordance with the invention. Only the optical error signal, $e_v$, is used. FIG. 2 adds a substitute reference signal, $\hat{r}$, into the feedback loop to simulate the reference signal, r. This typically results in estimator 240 and the control loop having a smaller error in response to the reference signal, r, if the substitute reference signal, $\hat{r}$, is a reasonable approximation to the actual reference signal, r. Estimator 240 and the control loop respond directly to $\hat{r}$ instead of responding to r by eliminating the error, e. Therefore, if the substitute reference signal, r̂, is a reasonable estimate of the reference signal, r, state space controller 220 comes much closer to behaving as if it is tracking the reference signal, r, instead of being an output error only system. Typically, this lowers the amount of error in estimator 240 and improves the tracking of the closed-loop system. The signal received by estimator 240 is $\hat{y}_v = e_v + \hat{r}$, which is an estimate of $y_v$, the noise corrupted measurement along with the output signal, u, of state space controller 220. Estimator 240 outputs state estimate, x̂, to state feedback gain K vector, of block 255. The output signal from K vector of block 255, integrator 225 and reference input gain matrix, N̄, of block 265, passes to summing block 295 to generate the output signal, u, of state space controller 220. Note that the output of the reference input gain matrix, N̄, of block 265 is a scaled and vectorized form of the substitute reference signal, r̂.

Figure 3:
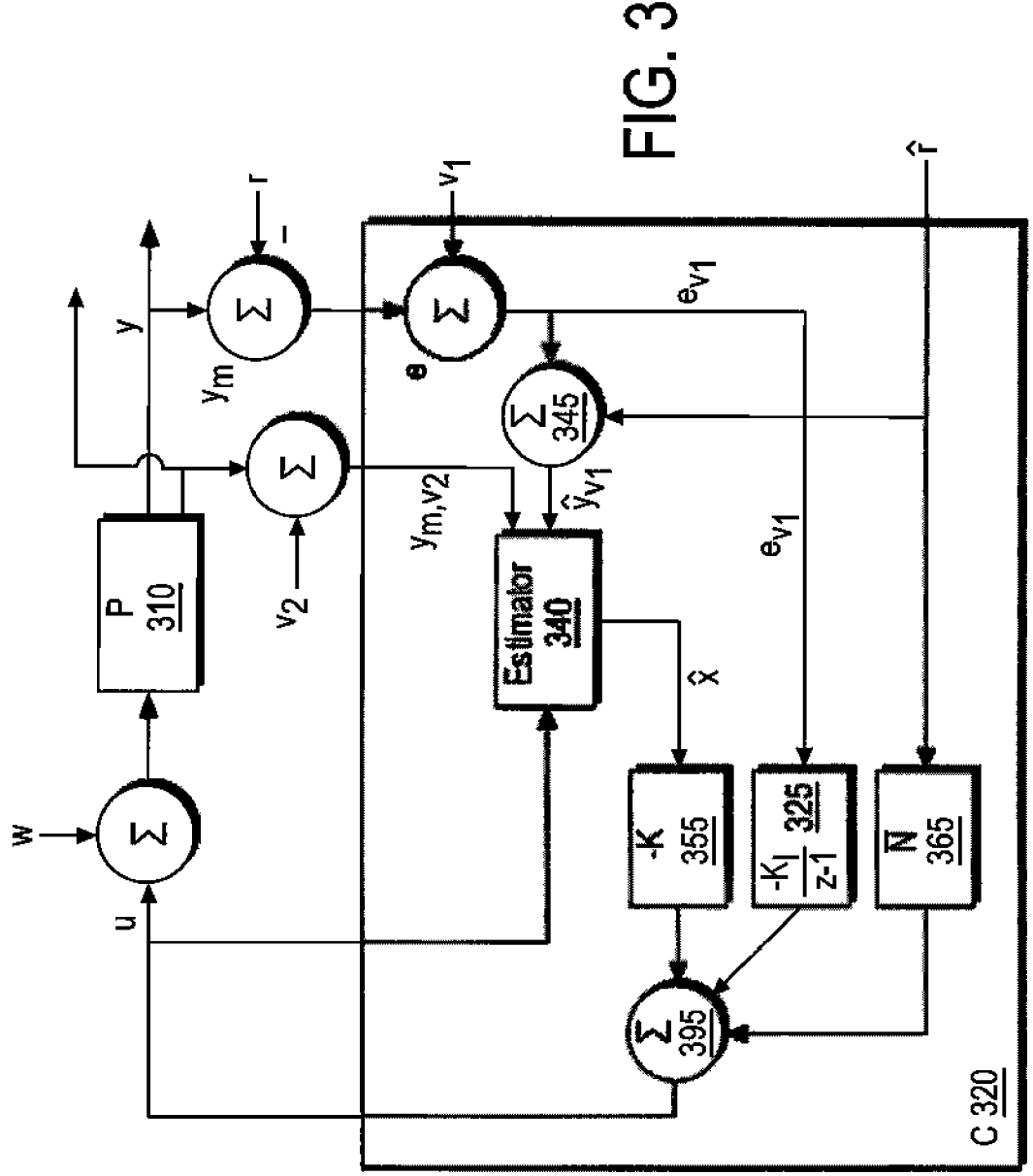
FIG. 3 shows a feed back loop in accordance with the invention.

FIG. 3 shows state space controller 320 with integral action and output error for physical system 310 in accordance with the invention. Here the actuator that is mechanically coupled to the cantilever/tip and controls the cantilever/tip motion has a position sensor that provides the absolute position of the actuator. Both the optical error signal, $e_{v_1}$, and the actuator position signal, $y_{M,v_2}$, are used. The actuator position signal, $y_{M,v_2}$, at frequencies below the resonance frequency of the cantilever/tip typically is a scaled version of the actual cantilever/tip position. Here $v_1$ and $v_2$ are the noise associated with the optical sensor and the actuator position sensor, respectively. Estimator 340 receives both $\hat{y}_{v_1} = e_{v_1} + \hat{r}$, which is an estimate of $y_v$, the noise corrupted measurement and $y_{M,v_2} = y_M + v_2$, which is the noise corrupted measurement of the absolute actuator position along with the output signal, u, of state space controller 320. Estimator 340 outputs state estimate, x̂, to state feedback gain vector K, of block 355. The output signal from K vector of block 355, integrator 325 and reference input gain matrix, N̄, of block 365, passes to summing block 395 to generate the output signal, u, of state space controller 320. Note that the output of the reference input gain matrix, N̄, of block 365 is a scaled and vectorized form of the substitute reference signal, r̂.

Note that in FIG. 2 and FIG. 3, integrator 225 and integrator 325, respectively, may be removed by setting K to zero. Integrators are typically good for steady state error but can have negative effects on system stability. In typical operation, controllers 220 and 320 may switch off integrators 225 and 325, respectively, when the error, e, becomes larger than some threshold value and only switch integrators 225 and 325, respectively, back on when the error, e, is less than some predetermined value. In this case, the set of gains with integrator 225 or 325 set to "off" (i.e. $K_{no\_int\ egrator}$, $\bar{N}_{no\_int\ egrator}$) allow the closed-loop system to rapidly reduce the error, e, and then the set of gains with integrator 225 or 325 set to "on" would have desirable steady state properties.

Figure 4B:
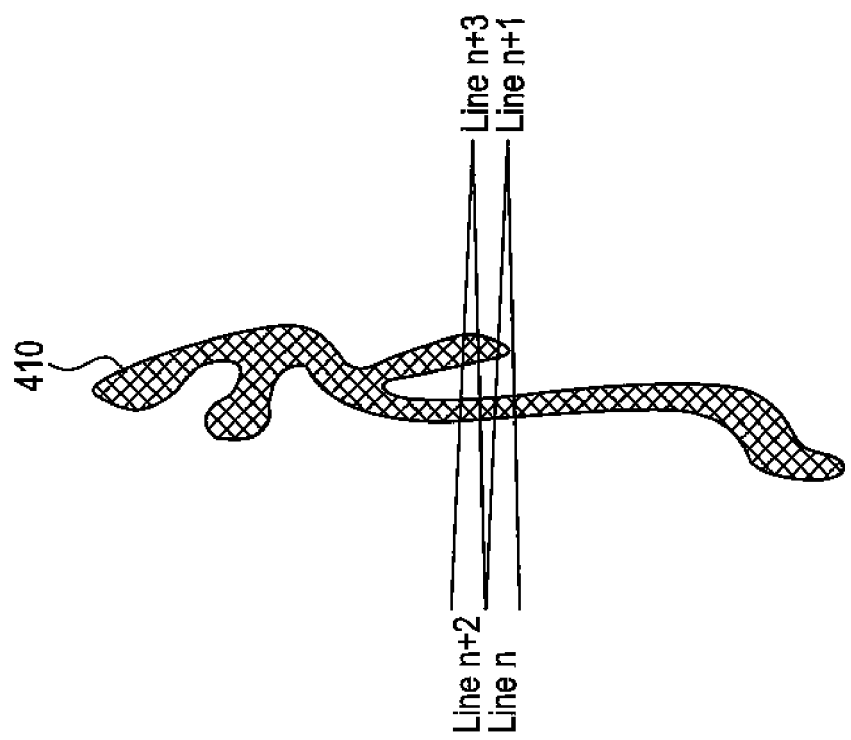
FIGS. 4a-b shows aspects of a typical raster scan.
Figure 4A:
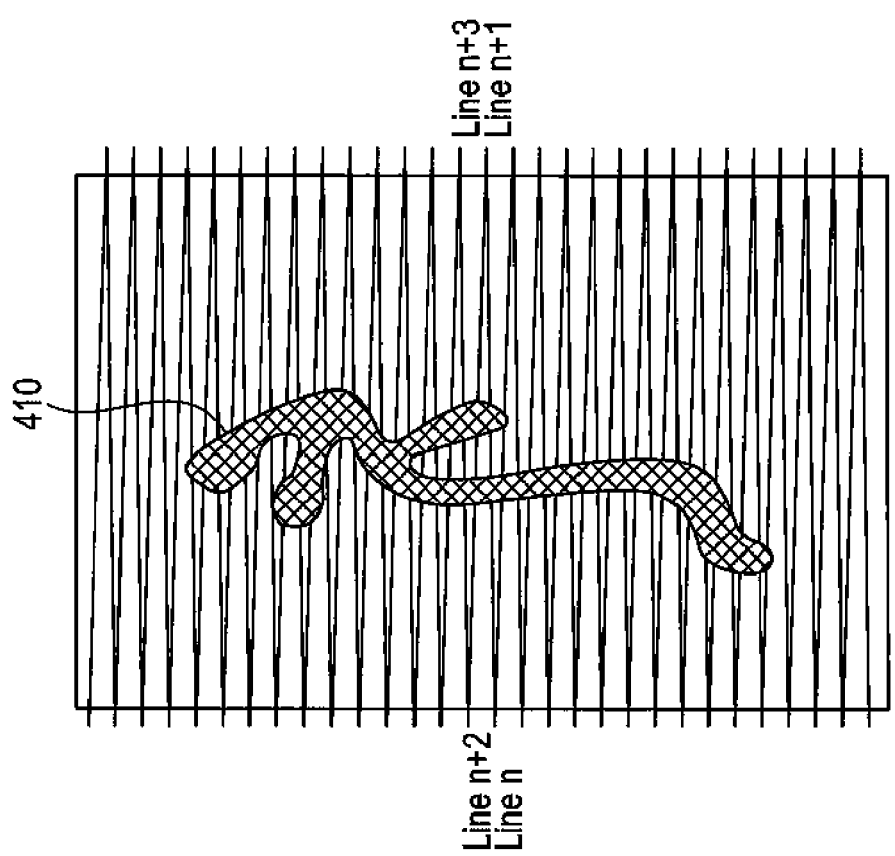

FIG. 4a shows a typical raster scan of an arbitrarily shaped surface 410. Typically, in a raster scan neighboring lines are scanned in alternate directions. Hence, line n in FIG. 4a is scanned in a direction opposite from line n+1. Because of nonlinear interaction between the cantilever/tip and the surface, the response typically is different in opposite scan directions, the scan images are typically constructed from either the odd or even scan lines. FIG. 4b isolates several scan lines whereas FIG. 4a shows an entire scan at some resolution.

Figure 5B:
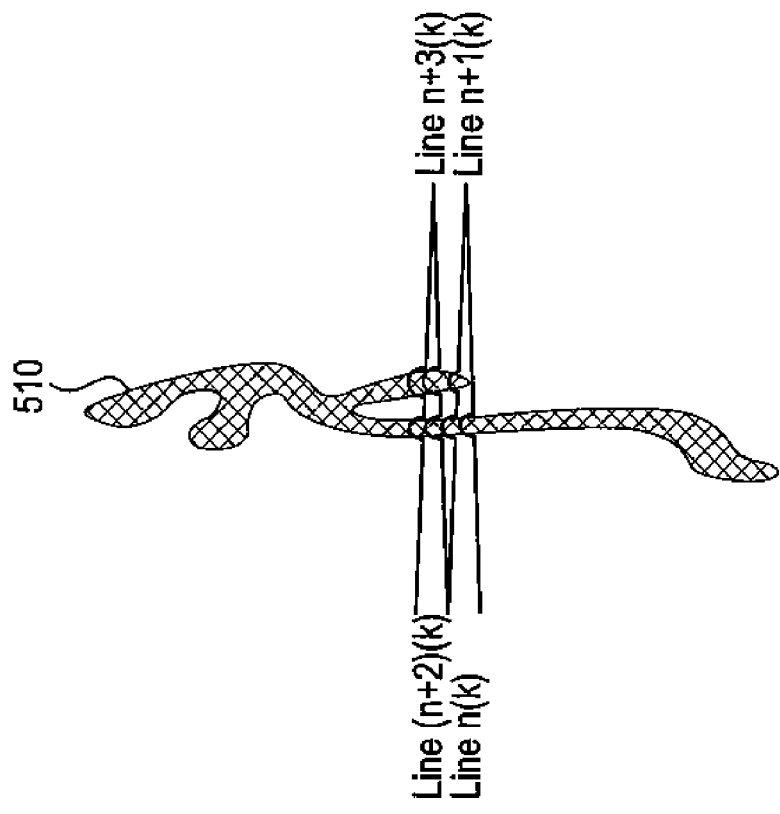
FIG. 5b shows the concept of iteration over several scans.
Figure 5A:
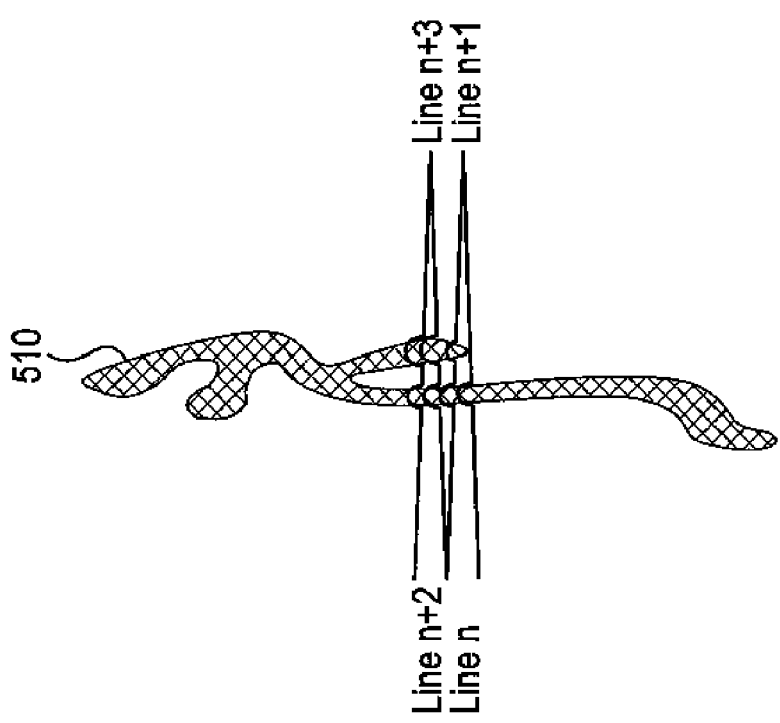
FIG. 5a shows several scan lines of a surface scan for a scanning probe microscope.

FIGS. 5a and 5b show several scan lines of a surface scan for a scanning probe microscope. FIG. 5a shows that if the features of surface 510 are comparatively large with respect to the scan resolution, line n is a reasonable predictor of the feature at line n+2. If the reverse scan direction can be utilized, line n+1 is typically an even better predictor of the feature at line n+2. FIG. 5b shows the concept of iteration over several image scans. Lines scanned at a time k are typically an excellent predictor of lines scanned at a later time k+1.

Hence, a suitable source of the substitute reference signal, r̂ may be the previous line in either the same scan direction or the opposite scan direction. Another suitable source of the substitute reference signal, r̂ may be a previously scanned image of surface 510. A preliminary scan of surface 510 may be performed at a lower resolution and/or at higher speed that provides information regarding surface 510. For example, the points from a low resolution scan of a surface can be interpolated to provide a high resolution reference estimate for a high resolution scan. The previously scanned image of surface 510 along with the scan pattern allows construction of the substitute reference signal, r̂. Providing the substitute reference signal, r̂, to estimator 240 or 340 reduces the error in the control system. This is because estimator 240 or 340 performs better with an estimate to follow, i.e., $\hat{y}_v = e_v + \hat{r}$. Additionally, controller 220 or 320 are provided with a feedforward signal for reference input gain matrix, N̄, of block 265 that allows a faster system response, thereby reducing the error, e. The scan process may be iterated so that each preceding scan provides the substitute reference signal, r̂, for the subsequent scan. The measurement accuracy of the preceding scan can be used to determine the weight given to the substitute reference signal, r̂, of the subsequent scan.

There are many possible embodiments in accordance with the invention. In an embodiment with reference to FIG. 2, the first scan line scanned by a scanning probe microscope is scanned with the substitute reference signal, r̂, set to zero. The substitute reference signal, r̂, is input to reference input gain matrix, N̄, of block 265. The values for reference input gain matrix, N̄, of block 265 are generated using the controller design gains, the K vector of block 255 in FIG. 2. In accordance with the invention, the K vector may be optionally generated using the Linear Quadratic Regulator, see for example, Franklin et al., Feedback Control of Dynamic Systems, 2002 or Franklin et al., Digital Control of Dynamics, 1998. During the scanning of subsequent lines, the substitute reference signal, r̂, is determined by:

$$\hat{r}(\alpha_n, \beta_k) = \hat{y}(\alpha_n, \beta_{k-2}) \quad (1)$$

where $\hat{y}(\alpha_n, \beta_{k-2})$ is the surface estimate at the surface coordinate position $(\alpha_n, \beta_{k-2})$, where $\alpha, \beta$ are the rectilinear surface coordinates and k is the number of the current scan line with n the index along the scan line. The substitute reference signal, $\hat{r}(\alpha_n, \beta_k)$, is input into the reference input gain matrix, N̄, of block 265 and into summing block 245 which is coupled to estimator 240 so that $\hat{y}_v$ is input into estimator 240. In accordance with invention, estimator 240 may optionally be generated using Kalman filter methods or $H_\infty$ methods, see for example, Franklin et al., "Feedback Control of Dynamic Systems", 2002 or Franklin et al., "Digital Control of Dynamics", 1998.

In an embodiment with reference to FIG. 2, the first scan line scanned by a scanning probe microscope is scanned with the substitute reference signal, r̂, set to zero. The substitute reference signal, r̂, is input to reference input gain matrix, of block 265. During the scanning of subsequent lines, the substitute reference signal, r̂, is determined by Eq. (1). The substitute reference signal, $\hat{r}(\alpha_n, \beta_k)$, is input into the reference input gain matrix, N̄, of block 265 and into summing block 245 which is coupled to estimator 240 so that $\hat{y}_v$ is input into estimator 240. In accordance with invention, estimator 240 may optionally be generated using Kalman filter methods. The values for reference input gain matrix, $\overline{N}$, of block 265 are generated using the controller design gains, the K vector of block 255 in FIG. 2. In accordance with the invention, the K vector may be optionally generated using the Linear Quadratic Regulator or $H_\infty$ methods. Once a first surface scan image is formed, a substitute reference signal, $\hat{r}(t_m,\alpha_n,\beta_k)$, is formed for a subsequent surface scan:

$$\hat{r}(t_m,\alpha_n,\beta_k)=\hat{y}(t_{m-1},\alpha_n,\beta_k) \quad (2)$$

where $t_m$ denotes the current scan and $t_{m-1}$ denotes the previous scan. The previous surface scan image is used the generate the substitute reference signal, $\hat{r}(t_m,\alpha_n,\beta_k)$ for a subsequent scan. The substitute reference signal, $\hat{r}(t_m, \alpha_n,\beta_k)$ is input into reference input gain matrix, $\overline{N}$, of block 265 and into summing block 245 which is coupled to estimator 240. The procedure may be iterated using a previous scan to generate the substitute reference signal for the following scan of the same surface.

In an embodiment with reference to FIG. 2, the first scan line scanned by a scanning probe microscope is scanned with the substitute reference signal, $\hat{r}$, set to zero. The substitute reference signal, $\hat{r}$, is input to reference input gain matrix, $\overline{N}$, of block 265. During the scanning of subsequent lines, the substitute reference signal, $\hat{r}$, is determined by Eq. (1). The substitute reference signal, $\hat{r}(\alpha_n,\beta_k)$, is input into the reference input gain matrix, $\overline{N}$, of block 265 and into summing block 245 which is coupled to estimator 240 so that $\hat{y}_v$ is input into estimator 240. In accordance with invention, estimator 240 may optionally be generated using Kalman filter methods. The values for reference input gain matrix, $\overline{N}$, of block 265 are generated using the controller design gains, the K vector of block 255 in FIG. 2. In accordance with the invention, the K vector may be optionally generated using the Linear Quadratic Regulator or $H_\infty$ methods. Once a first surface scan image is formed, a substitute reference signal, $\hat{r}(t_m,\alpha_n,\beta_k)$, is formed for a subsequent surface scan:

$$\hat{r}(t_m,\alpha_n,\beta_k)=(1-\lambda)\hat{y}(t_m,\alpha_n,\beta_{k-2})+\lambda\hat{y}(t_{m-1},\alpha_n,\beta_k) \quad (3)$$

where $\hat{y}(t_m,\alpha_n,\beta_{k-2})$ is the previous scan line of the current surface scan, $\hat{y}(t_{m-1}, \alpha_n,\beta_k)$ is the current scan line from the previous scan image and $\lambda$ is a weighting factor. The weighting factor, $\lambda$, selection typically depends on the characteristics of the surface to be scanned. For a surface that is not changing with time, the choice of the weighting factor, $\lambda$, close to unity is appropriate as this provides data from a previous scan of the same position. However, if the surface is changing in time, as may be the case for the surface of a biological sample, more recent data would require a user to choose a weighting factor, $\lambda$, closer to zero. Using a previous image requires that the images be well registered relative to each other. Some combination of the previous of the previous line scan and the previous image are used to form the substitute reference signal, $\hat{r}(t_m,\alpha_n,\beta_k)$. The substitute reference signal, $\hat{r}(t_m,\alpha_n,\beta_k)$ is input into reference input gain matrix, $\overline{N}$, of block 265 and into summing block 245 which is coupled to estimator 240.

The use of an actuator that is mechanically coupled to the cantilever/tip and controls the cantilever/tip motion with a position sensor that provides the absolute position of the actuator allows an additional estimator input as shown in FIG. 3. The embodiments discussed above with respect to FIG. 2 can be applied to FIG. 3 where estimator 340 receives the actuator position signal, $y_{M,v_2}$.

In an embodiment with reference to FIG. 3, the first scan line scanned by a scanning probe microscope is scanned with the substitute reference signal, $\hat{r}$, set to zero. The substitute reference signal, $\hat{r}$, is input to reference input gain matrix, $\overline{N}$, of block 365. During the scanning of subsequent lines, the substitute reference signal, $\hat{r}$, is determined by Eq. (1) above. The substitute reference signal, $\hat{r}(\alpha_n,\beta_k)$, is input into the reference input gain matrix, $\overline{N}$, of block 365 and into summing block 345 which is coupled to estimator 340 so that $\hat{y}_{v_1}$ is input into estimator 340 along with the actuator position signal, $y_{M,v_2}$. In accordance with invention, estimator 340 may optionally be generated using Kalman filter methods or $H_\infty$ methods. The values for reference input gain matrix, $\overline{N}$, of block 365 are generated using the controller design gains, the K vector of block 355 in FIG. 3. In accordance with the invention, the K vector may be optionally generated using the Linear Quadratic Regulator or $H_\infty$ methods.

In an embodiment with reference to FIG. 3, the first scan line scanned by a scanning probe microscope is scanned with the substitute reference signal, $\hat{r}$, set to zero. The substitute reference signal, $\hat{r}$, is input to reference input gain matrix, $\overline{N}$, of block 365. During the scanning of subsequent lines, the substitute reference signal, $\hat{r}$, is determined by Eq. (1) above. The substitute reference signal, $\hat{r}(\alpha_n,\beta_k)$, is input into the reference input gain matrix, $\overline{N}$, of block 365 and into summing block 345 which is coupled to estimator 340 so that $\hat{y}_{v_1}$ is input into estimator 340 along with the actuator position signal, $y_{M,v_2}$. In accordance with invention, estimator 340 may optionally be generated using Kalman filter methods. The values for reference input gain matrix, $\overline{N}$, of block 365 are generated using the controller design gains, the K vector of block 355 in FIG. 3. In accordance with the invention, the K vector may be optionally generated using the Linear Quadratic Regulator. Once a first surface scan image is formed, a substitute reference signal, $\hat{r}(t_m,\alpha_n,\beta_k)$, is formed for a subsequent surface scan using Eq. (2) above. The substitute reference signal, $\hat{r}(t_m,\alpha_n,\beta_k)$ is input into reference input gain matrix, $\overline{N}$ and into summing block 345 which is coupled to estimator 340 so that $\hat{y}_{v_1}$ is input into estimator 340 along with the actuator position signal, $y_{M,v_2}$. The procedure may be iterated using a previous scan to generate the substitute reference signal for the following scan of the same surface.

In an embodiment with reference to FIG. 3, the first scan line scanned by a scanning probe microscope is scanned with the substitute reference signal, $\hat{r}$, set to zero. The substitute reference signal, $\hat{r}$, is input to reference input gain matrix, $\overline{N}$, of block 365. During the scanning of subsequent lines, the substitute reference signal, $\hat{r}$, is determined by Eq. (1). The substitute reference signal, $\hat{r}(\alpha_n,\beta_k)$, is input into the reference input gain matrix, $\overline{N}$, of block 365 and into summing block 345 which is coupled to estimator 340 so that $\hat{y}_{v_1}$ is input into estimator 340 along with the actuator position signal, $y_{M,v_2}$. In accordance with invention, estimator 340 may optionally be generated using Kalman filter methods. The values for reference input gain matrix, $\overline{N}$, of block 365 are generated using the controller design gains, the K vector of block 355 in FIG. 3. In accordance with the invention, the K vector may be optionally generated using the Linear Quadratic Regulator. Once a first surface scan image is formed, a substitute reference signal, $\hat{r}(t_m,\alpha_n,\beta_k)$, is formed for a subsequent surface scan using Eq (3) above. Some combination of the previous of the previous line scan and the previous image are used to form the substitute reference signal, $\hat{r}(t_m,\alpha_n,\beta_k)$. The substitute reference signal, $\hat{r}(t_m,\alpha_n,\beta_k)$ is input into reference input gain matrix, $\overline{N}$, of block 365 and into summing block 345 which is coupled to estimator 340 so that $\hat{y}_{v_1}$ is input into estimator 340 along with the actuator position signal, $y_{M,v_2}$.

The invention claimed is:

1. A controller apparatus with integral action and output error for a scanning probe microscope comprising:
   a summing block that is operable to output a controller output signal to said scanning probe microscope;
   an estimator coupled to said summing block, said estimator operable to directly receive an input signal that depends on an optical error signal and on a substitute reference signal and operable to generate a state estimate using said input signal that is communicated to said summing block; and
   a reference input gain matrix coupled to said summing block, said reference input gain matrix operable to directly receive said substitute reference signal and operable to use said substitute reference signal to generate a scaled and vectorized substitute reference signal that is directly communicated to said summing block.

2. The apparatus of claim 1 wherein said substitute reference signal for a current scan line of a surface scan is formed using a previous scan line of said surface scan.

3. The apparatus of claim 1 wherein said estimator is generated using Kalman filter methods.

4. The apparatus of claim 1 wherein said estimator is generated using $H_\infty$ methods.

5. The apparatus of claim 1 wherein said controller apparatus comprises controller design gains that are generated using the Linear Quadratic Regulator.

6. The apparatus of claim 1 wherein said controller apparatus comprises controller design gains that are generated using $H_\infty$ methods.

7. The apparatus of claim 1 wherein said substitute reference signal for a current surface scan is formed using a prior surface scan image scanned by said scanning probe microscope.

8. The apparatus of claim 1 wherein said substitute reference signal for a current scan line is formed using a linear combination of a prior surface scan image and a previous scan line.

9. A controller apparatus with integral action and output error for a scanning probe microscope comprising:
   a summing block that is operable to output a controller output signal to said scanning probe microscope;
   an estimator coupled to said summing block, said estimator operable to directly receive a first input signal that depends on an optical error signal and on a substitute reference signal and a second input signal that depends on an actuator position signal, said estimator operable to use said first and said second input signal to generate a state estimate that is communicated to said summing block; and
   a reference input gain matrix coupled to said summing block, said reference input gain matrix operable to directly receive said substitute reference signal and operable to use said substitute reference signal to generate a scaled and vectorized substitute reference signal that is directly communicated to said summing block.

10. The apparatus of claim 9 wherein said substitute reference signal for a current scan line of a surface scan is formed using a previous scan line of said surface scan.

11. The apparatus of claim 9 wherein said estimator is generated using Kalman filter methods.

12. The apparatus of claim 9 wherein said estimator is generated using $H_\infty$ methods.

13. The apparatus of claim 9 wherein said controller apparatus comprises controller design gains that are generated using the Linear Quadratic Regulator.

14. The apparatus of claim 9 wherein said controller apparatus comprises controller design gains that are generated using $H_\infty$ methods.

15. The apparatus of claim 9 wherein said substitute reference signal for a current surface scan is formed using a prior surface scan image scanned by said scanning probe microscope.

16. The apparatus of claim 9 wherein said substitute reference signal for a current scan line is formed using a linear combination of a prior surface scan image and a previous scan line.

* * * * *